United States Patent

Morimoto et al.

[11] Patent Number: 5,943,855
[45] Date of Patent: Aug. 31, 1999

[54] LUBRICANT RETAINING CHAIN

[75] Inventors: Masaru Morimoto, Osaka, Japan; Leon N. Ducharme, Holyoke, Mass.

[73] Assignees: Tsubakimoto Chain Co., Osaka, Japan; U.S. Tsubaki, Inc., Ill.

[21] Appl. No.: 09/095,123

[22] Filed: Jun. 10, 1998

[51] Int. Cl.$^6$ .................. F16G 13/06; B21L 9/00
[52] U.S. Cl. .................. 59/5; 59/78; 474/206; 474/207
[58] Field of Search .................. 59/4, 5, 78, 93; 474/206, 207

[56] References Cited

U.S. PATENT DOCUMENTS

| | | | |
|---|---|---|---|
| 3,135,128 | 6/1964 | Rudolph | 474/207 |
| 3,492,885 | 2/1970 | Nolte | 474/207 |
| 4,594,846 | 6/1986 | Livesay et al. | 59/5 |
| 5,459,993 | 10/1995 | Kuriyama et al. | 59/4 |
| 5,809,767 | 9/1998 | Tanaka | 59/5 |

FOREIGN PATENT DOCUMENTS

| | | | |
|---|---|---|---|
| 56-71545 | 6/1981 | Japan . | |
| 57-57939 | 4/1982 | Japan | 59/4 |
| 63-125842 | 5/1988 | Japan | 59/5 |
| 1-238734 | 9/1989 | Japan | 59/4 |

*Primary Examiner*—David Jones
*Attorney, Agent, or Firm*—Armstrong, Westerman, Hattori, McLeland and Naughton

[57] ABSTRACT

A chain includes a plurality of link assemblies connected with each other. One of the adjacent link assemblies has a first pair of plates disposed apart in the direction perpendicular to the longitudinal direction of the chain and a pair of hollow cylindrical bushes press-fitted to the first pair of plates. The other of the adjacent link assemblies has a second pair of plates disposed apart in the direction perpendicular to the longitudinal direction of the chain so as to locate at the outside of the first pair of plates and a pin penetrated through the bush and press-fitted to the second pair of plates. A moisture absorption member which retains lubricant oil between the bush and the pin is placed between facing surfaces of the first and second plates. The moisture absorption member has a large deformation amount and a small restoration amount.

10 Claims, 4 Drawing Sheets

LUBRICANT RETAINING CHAIN

FIELD OF THE INVENTION

The present invention relates to a chain which can retain the lubricant oil between a pin and a bush, as well as between a bush and a roller.

BACKGROUND OF THE INVENTION

A conventional chain, for example, a roller chain for use in a power drive disclosed in an Unexamined Japanese Utility Model Publication No. SHO 56-71545, includes an inner link assembly having a pair of inner plates disposed in parallel with each other and a pair of hollow cylindrical bushes press-fitted in fore and aft portions of the inner plates, and an outer link assembly having a pair of outer plates disposed in parallel with each other and a pair of pins press-fitted in fore and aft portions of the outer plates. The inner link assembly and the outer link assembly are alternatively connected. In addition, provided around each bush is a roller which engages a sprocket.

In this type of chain, there is a sliding contact between the bush and the pin. Furthermore, there is a sliding contact between the bush and the roller. In order to facilitate such a sliding contact, lubricant oil is coated or supplied between the bush and the pin, as well as between the bush and the roller. When this lubricant oil leaks out during the operation of the chain, abrupt abrasion between the bush and pin, and between the bush and the roller will occur due to a lack of lubricant oil.

In the roller chain disclosed in the above-mentioned publication, an O-ring made of elastic materials is provided in a compressed state so as to touch the end face of the bush and located between the surfaces of the inner and outer plates which face one another. Furthermore, an O-ring made of elastic materials is provided in a compressed state between the outer surface of the bush and the inner surface or the edged of the roller. These O-rings prevent lubricant oil leakage from between the bush and the pin, and between the bush and the roller to the outside thereof.

In order to retain the lubricant oil, however, the O-rings are compressed between the inner and outer plates or between the bush and the roller. Therefore, if the compressive force upon the O-rings is large, the O-rings will be quickly worn down by the bending motion of the chain, which results in that the lubricant oil will no longer be retained, and therefore the abrasion between the bush and the pin, and between the bush and the roller will progress.

On the other hand, if the compressive force upon the O-rings is small, the lubricant oil retaining function decreases. Due to this, the lubricant oil between the bush and the pin, and between the bush and the roller easily leaks out, causing inferior lubrication.

Furthermore, if the compressive force upon the O-ring is large, the resistance to the bending motion of the chain and the rotational resistance of the roller will become large, thereby the transmission loss of the driving power will become large when the chain is in operation.

Therefore, the clearance between the surfaces of the inner and outer plates which face one another, as well as the clearance between the outer surface of the bush and the inner surface of the roller must be strictly managed, and an appropriate compressive force must be given to the O-rings. In order to accomplish this, not only would the measurement accuracy of each part have to be improved, but the assembly accuracy of each part would also have to be improved.

The object of the present invention is to provide a chain that can prevent lubricant oil leakage between the bush and the pin, and between the bush and the roller, and that can retain the lubricant oil therebetween.

Another object of the present invention is to provide a chain that, in allowing excellent bending motion of the chain, can retain the lubricant oil between the bush and the pin, and between the bush and the roller.

Another object of the present invention is to provide a chain that, in allowing easy manufacturing of each part which makes up the chain and easy assembly of these parts, can retain lubricant oil between the bush and the pin, and between the bush and the roller.

Still another object of the present invention is to provide a chain that can supply lubricant oil between the bush and the pin, and between the bush and the roller.

SUMMARY OF THE INVENTION

The present invention provides a chain including a plurality of link assemblies connected with each other, wherein one of the adjacent link assemblies has a first pair of plates disposed apart in the direction perpendicular to the longitudinal direction of the chain and a pair of hollow of cylindrical bushes press-fitted to the first pair of plates, and wherein the other of the adjacent link assemblies has a second pair of plates disposed apart in the direction perpendicular to the longitudinal direction of the chain so as to locate at the outside of the first pair of plates and a pin penetrated through the bush and press-fitted to the second pair of plates, and wherein a moisture absorption member which retains lubricant oil between the bush and the pin is placed between facing surfaces of the first and second plates.

It is preferable that the moisture absorption member is felt, non-woven fabric, or sponge. The moisture absorption member can absorb and supply lubricant oil. In addition, since these materials are larger in deformation and small in restoration force, these materials can retain lubricant oil in the lubricant oil leakage route without causing an increase of the bending resistance of the chain, even when there is a measurement error in the chain.

It is preferable that the lubricant oil is impregnated in the moisture absorption member in advance. If this is the case, a large amount of lubricant oil can be retained inside the chain, and lubricant oil can be supplied to the chain for a long time.

As is necessary, it is preferable to adhere the moisture absorption member to one of the facing surfaces. Adhering the moisture absorption member on either the inner plate or the outer plate in advance enables a positioning of the moisture absorption member on either the inner plate or the outer plate, facilitating a manufacturing of the chain without assembling a moisture absorption member as a separate part. Also, it is preferable that the first pair of plates constitutes the inner plates and the second pair of plates constitutes the outer plates, and the moisture absorption member is adhered to the inner surface of the outer plate so as to remain a space surrounding the bush.

Furthermore, it is preferable that the bush be composed of sintered metal, and that lubricant oil is impregnated in the bush. In addition to impregnating the lubricant oil in the moisture absorption member, impregnating the lubricant oil in the bush made of sintered metal can further retain large amounts of lubricant oil in the inside of the chain, improving the lifespan of the chain against abrasion.

The present invention further provides a chain including a plurality of link assemblies connected with each other, wherein one of the adjacent link assemblies has a first pair of plates disposed apart in the direction perpendicular to the longitudinal direction of the chain and a pair of hollow cylindrical bushes press-fitted to the first pair of plates, and wherein the other of the adjacent link assemblies has a second pair of plates disposed apart in the direction perpendicular to the longitudinal direction of the chain so as to locate at the outside of the first pair of plates and a pin penetrated through the bush and press-fitted to the second pair of plates, and wherein a roller is provided around the bush, and wherein a moisture absorption member which retains lubricant oil between the bush and the roller is provided on the inside of the first pair of plates so as to contact the roller.

According to this chain, it can retain lubricant oil which is coated or supplied between the bush and the roller by the moisture absorption member. In addition, by combining this structure with the structure that retains lubricant oil coated or supplied between the aforementioned pin and the bush, the lifespan of the chain can be even further improved.

According to one embodiment of the chain, the moisture absorption members are adhered to the first pair of the inner plates, and are facing each other on the insides of the plates. Thus, the moisture absorption members touch the outer surface of the roller, thereby the lubricant oil between the bush and the roller is retained.

According to another embodiment of the chain, the roller has a pair of circular stepped portions on the inner surface of both of its edges, and the moisture absorption members are placed in the circular stepped portions. The moisture absorption member either touches the bush and the roller or the first pair of plates and the roller, so as to close off the lubricant oil leakage route between the bush and the roller.

In particular, it is preferable to use a moisture absorption member which touches the inside of the first pair of plates, whose thickness is less than that of the roller, and which protrudes from the end faces of the roller. This enables an easy installation of the roller into the bush, and an assured retain of lubricant oil, and the transformation loss of the driving forth will be lessened when the chain is in operation.

Moreover, in this embodiment of the chain, there is no need to adhere moisture absorption members to each chain part. Therefore, it is easy to assemble the chain.

DETAILED DESCRIPTION OF THE PREFERRED EMBODIMENTS

Figure 1:
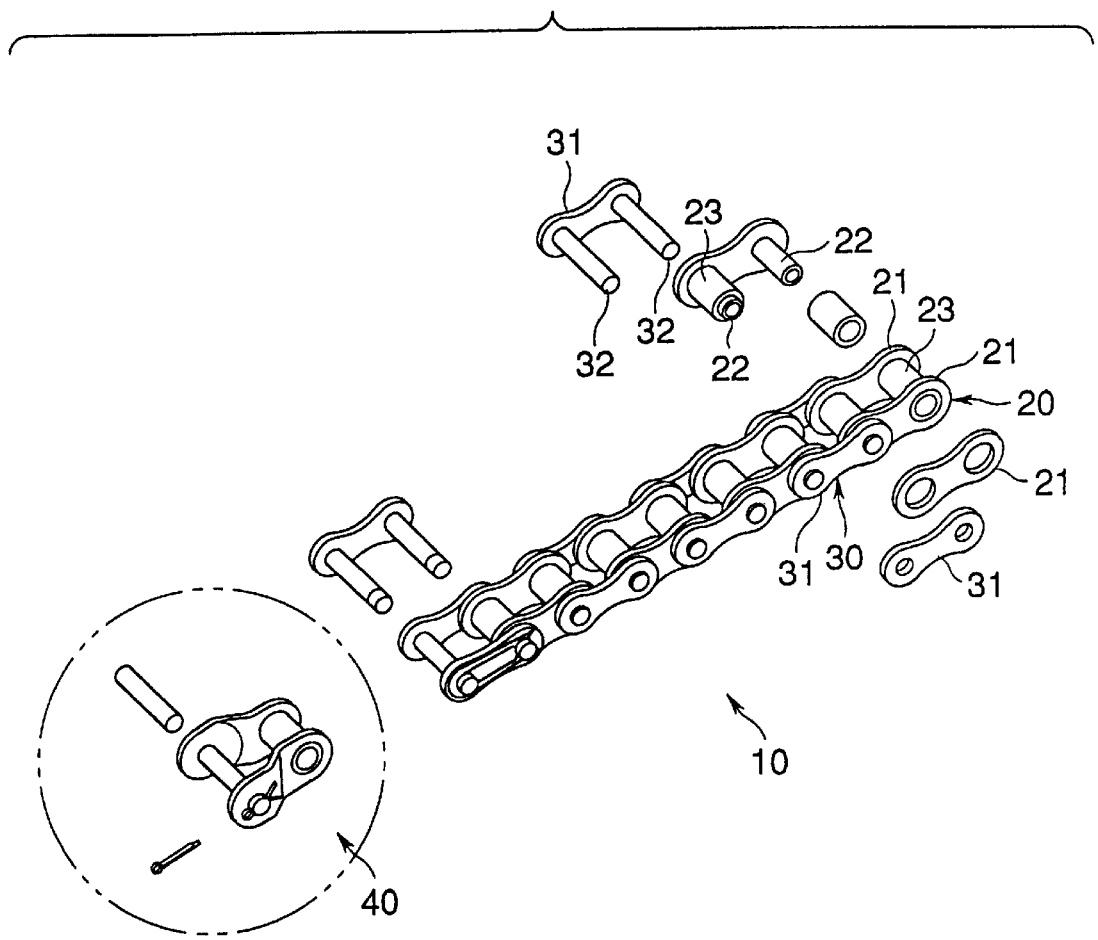
FIG. 1 is a perspective view in a disassembled state of a chain according to the present invention.

FIG. 1 is a perspective view of a chain according to the present invention. In the chain 10 according to the present invention, a number of link assemblies are connected endlessly. The chain 10 shown in FIG. 1 includes an N number of inner link assemblies 20 and an N number of outer link assemblies 30 connected with each other alternatively, except for the portion shown inside the dot-dash line. A link 40, shown inside the dot-dash line, is an offset link assembly for adjusting the overall chain length. The chain may be formed by a plurality of connected offset link assemblies.

The inner link assembly 20 has a pair of inner plates 21, 21 disposed in parallel and a pair of hollow cylindrical bushes 22, 22 each press-fitted into at each fore and aft ends of the inner plates. The outer link assembly 30 has a pair of outer plates 31, 31 disposed in parallel and a pair of pins 32, 32 each press-fitted into at each fore and aft ends of the inner plates. The pin 32 of the outer link assembly 30 penetrates the inside of the bush 22 of the inner link assembly 20, connecting the link assemblies alternatively.

Furthermore, a roller 23 to which a sprocket is engaged is rotatably fitted on the bush 22. There is sliding contact between the pin 32 and the bush 22 and between the bush 22 and the roller 23, so lubricant oil is coated or supplied between them. Among them, the bush 22 is made from sintered metal in order to effectively maintain the retaining power of the lubricant oil.

Figure 2:
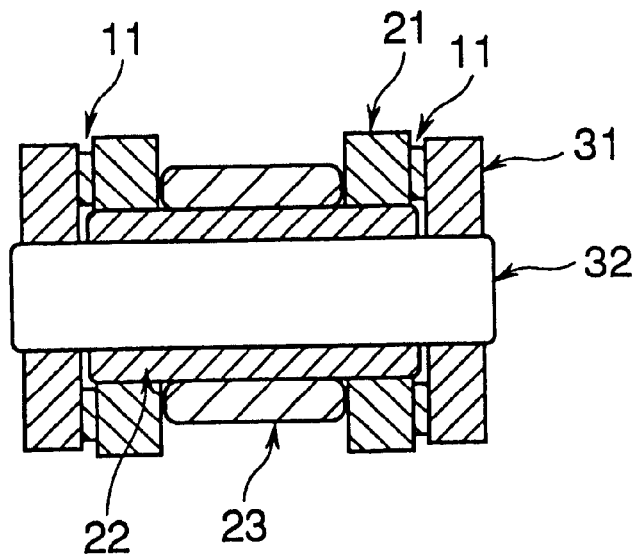
FIG. 2 is a cross-sectional view taken along the a central axis of the pin in an assembled chain.

Furthermore, in the present invention, in order to retain the lubricant oil between the pin 32 and the bush 22 and between the bush 22 and the roller 23, a moisture absorption member 11 is provided in the lubricant oil leakage route. The moisture absorption member shown in FIG. 2 is positioned between the inner plate 21 and the outer plate 31 to surround each end of the bush 22 in order to retain the lubricant oil between the pin 32 and the bush 22. The moisture absorption member 11 is adhered to the inner plate 21 or the outer plate 31, and has a thickness almost the same to the width of the clearance between the inner plate 21 and the outer plate 31.

The bush 22 protrudes from the outer surface of the inner plate 21. Therefore, the clearance for the moisture absorption member 11 is kept within the outer link assembly 30, even if the inner link assembly 20 moves in a direction perpendicular to the longitudinal direction of the chain 10 between the outer link assembly 30.

The moisture absorption member 11 is preferably made of felt. The felt may be, for example, wooly felt or synthetic fiber felt. Regarding synthetic fiber felt, oil-resistant and heat-resistant nylon or PTFE (teflon) felt is preferable. Furthermore, other than felt, a moisture absorption member which is large in deformation amount and small in restoration force, such as a non-woven fabric or sponge, may be utilized.

When adhering the felt or the like to the inner or outer plate, it is preferable to use such adhesive as synthetic rubber or vinyl acetate resin adhesive, especially comparatively high viscosity adhesive which does not permeate the felt.

When the lubricant oil between the pin 32 and the bush 22, for example, begins to leak out from in between the inner plate 21 and the outer plate 31 to the outside, it will be absorbed by the moisture absorption member, preventing leakage to the outer part of the chain, by positioning the moisture absorption member in the lubricant oil leakage route. By the positioning of the moisture absorption member in the lubricant oil leakage route, this moisture absorption member not only retains the lubricant oil in the chain, but also prevents alien substances from entering the inner part where there is sliding contact. Consequently, the life span of the chain can be prolonged when it is being used in inferior conditions that are very dusty or dirty through the seal function of the moisture absorption member.

Furthermore, by using felt-like compressible fiber, in addition to the lubricant oil absorption function, a chain bending resistance can be maintained low. In other words, because the felt has a small restoration force in addition that the felt can retain a lubricant oil without compressing the felt, the restoration force does not affect the bending resistance of the chain unfavorably. Therefore, compared with when, for instance, an O-ring is used to retain the lubricant oil, the tolerance of clearance between the inner plate 21 and the outer plate 31 is large, the lubricant oil can be retained in a necessary portion without extremely precisely manufacturing the parts of the chain and assembling them.

Furthermore, it is desirable to impregnate the lubricant oil in advance in the moisture absorption member 11. The impregnated moisture absorption member 11 functions to supply impregnating oil between the pin 32 and the bush 22 when there is a lack of lubricant oil between the aforementioned parts, and guards against the abrupt abrasion of the chain from a total loss of lubricant oil. In particular, in the case that the bush 22 is made of sintered metal, the lubricant oil can be supplied to the bush 22 from the moisture absorption member 11, and can guard against abrasion of the chain from a total loss of lubricant oil.

Figure 3A:
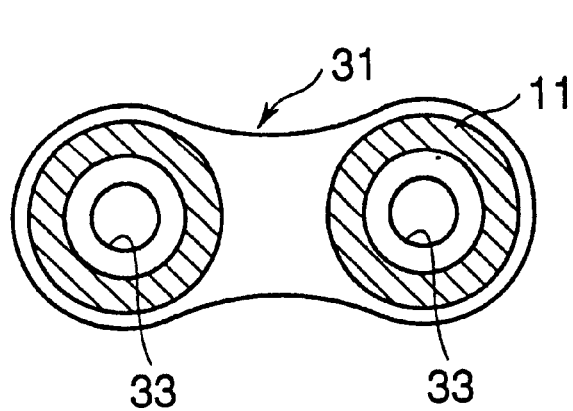
FIG. 3 is a front view of an outer plate to which moisture absorption members are adhered.
Figure 3B:
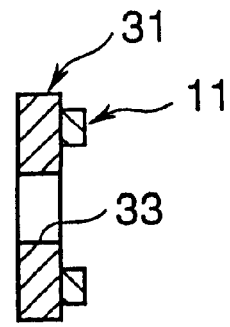
Figure 4A:
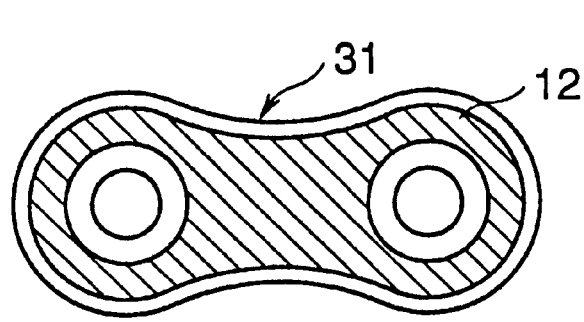
FIG. 4 is a front view of an outer plate to which another moisture absorption member is adhered.
Figure 4B:
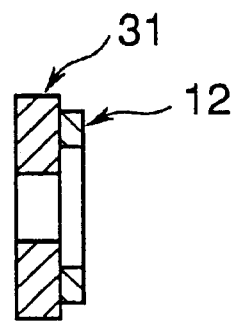

FIGS. 3 and 4, for example, show embodiments in which the moisture absorption member is positioned on the outer plate. FIG. 3 shows an embodiment in which a moisture absorption member 11 is adhered on the outer plate 31 so as to be concentric to a pin hole 33.

In the case that the chain is assembled, the moisture absorption member 11 surrounds the bush and closes off the leakage route of the coated or supplied lubricant oil between the pin and the bush. FIG. 4 shows an embodiment in which a sheet of moisture absorption member 12 having an open space for disposing the bush is adhered to the outer plate 31. Similar to the moisture absorption member shown in FIG. 3, the moisture absorption member 12 shown in FIG. 4 closes off the leakage route of the coated or supplied lubricant oil between the pin and the bush, however, the moisture absorption member shown in FIG. 4 has less parts, and thus has better formability and assembling.

In a state prior to the assembly of the chain, by adhering the moisture absorption member to the inner plate or outer plate, it is not necessary that the chain is assembled while the moisture absorption member is being positioned, thus improving the assembling of the chain.

Figure 5:
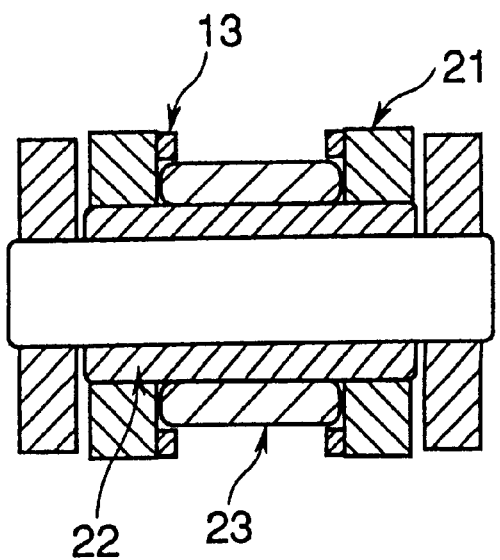
FIG. 5 is a cross-sectional view taken along the axis of the central pin in another assembled chain.

In FIG. 5, in order to retain the lubricant oil between the bush 22 and the roller 23, the moisture absorption members 13 are adhered to the corresponding inner surfaces of the inner plates 21 so as to surround each end surface of the roller 23. The moisture absorption member 13 may be a pair of moisture absorption members each independently surrounding the roller 23 at the both end portion of the inner plates 21. The moisture absorption member 13 may also be a sheet of moisture absorption member having a space for disposing the roller 23, which is adhered to the whole inner surface of the inner plate 21.

The moisture absorption member 13 is in a non-contact state with the roller 23, and, when lubricant oil leaks out from in between the bush 22 and the roller 23, the lubricant oil that has reached between the outer surface of the roller 23 and the inner surface of the moisture absorption member 13 is absorbed and retained by the moisture absorption member 13.

Furthermore, a restorable moisture absorption member made of felt, or the similar, may be adhered to both end surfaces of the roller 23, or a restorable moisture absorption member made of felt, or the similar, may be adhered to the inner surfaces of the inner plates 21 facing at both end faces of the roller 23.

Figure 6:
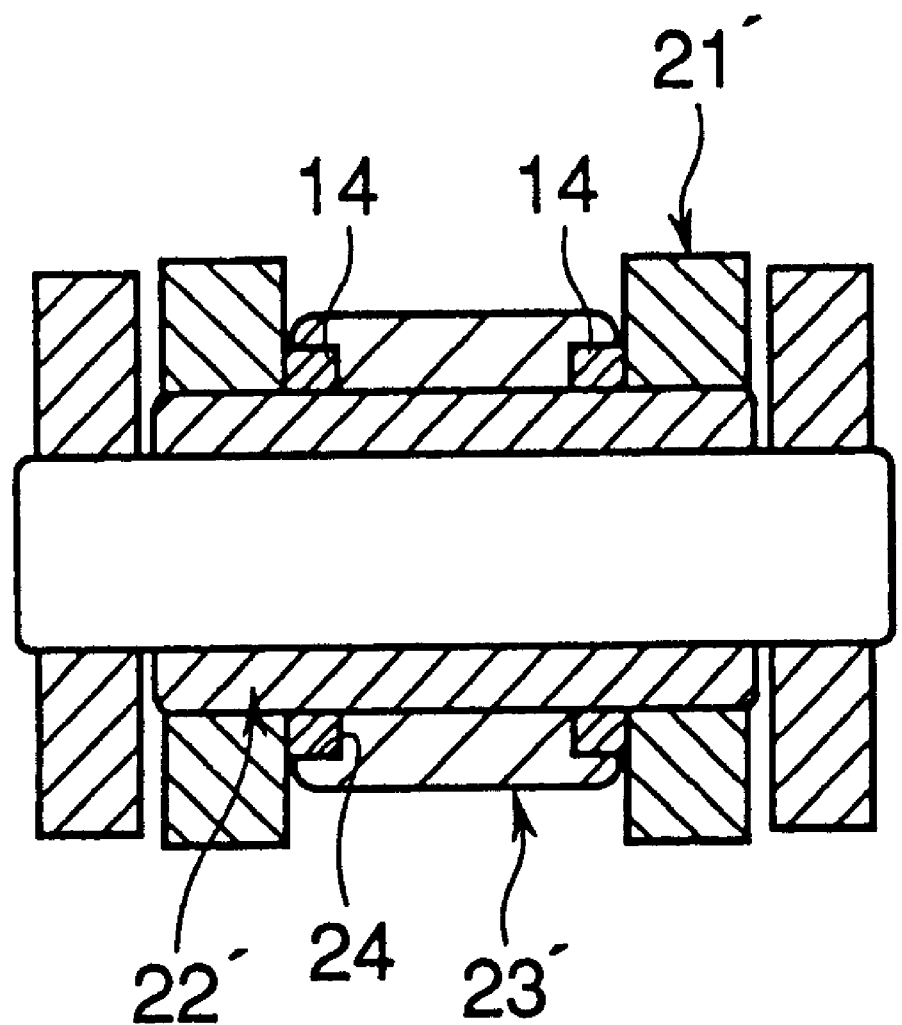
FIG. 6 is a cross-sectional view taken along the axis of the central pin in even another assembled chain.

FIG. 6 shows another embodiment in which the lubricant oil between the bush 22' and the roller 23' is retained. The roller 23' has circular stepped portions 24 formed on the inner surfaces of both edges for fitting all or a part of a moisture absorption member 14. The moisture absorption member 14 has a cross-sectional shape almost equal to the cross-sectional shape formed by the inner plate 21', the bush 22', and the roller ', and is touching each member, respectively. Also, the chain can be assembled by only fitting the moisture absorption member 14 in the circular stepped portion 24, not by adhering the moisture absorption member 14 to any members.

Furthermore, it is preferable that the moisture absorption member 14 touches the inner plate 21' in a state of retaining on the roller 23', without touching the bush 22'. In addition, it is preferable that the roller 23' is shorter than the interval of the inner plate 21 and the moisture absorption member 14 protrudes from its edges. Consequently, even if the roller 23' moves in the direction of the axis, there will not exist in the moisture absorption member a large deformation absorbed in the circular stepped portion 24 because the roller's 23' end face will be touching the inner surfaces of the inner plate 21. Also, the moisture absorption member 14 has a structure that remarkably reduces the transmission loss of the chain by friction to a minimum because the moisture absorption member 14 is touching the inner plate 21 in direction of the axis.

In one of the above embodiments, a moisture absorption member is positioned between the inner plate and the outer plate, and in the other of the embodiments, a moisture absorption member is positioned on the inner side of the inner plate. However, it is preferable that the moisture absorption member as illustrated in FIGS. 2 and 5 are provided in the chain in order to retain the lubricant oil between the pin and the bush, as well as the bush and the roller.

As stated above, when there is lubricant oil leakage, a moisture absorption member like a felt is used to close off the lubricant oil leakage route of the chain, the moisture absorption member absorbs the lubricant oil and retains, for example, the lubricant oil between the pin and the bush to maintain the bending operation of the chain for a long period. When the lubricant oil between the pin and the bush lacks, the lubricant oil will be supplied from the moisture absorption member, thereby preventing a abrupt abrasion between the pin and the bush.

By using a moisture absorption member such as a felt that is large in deformation but small in restoration force, a strict management of the clearance between the inner plate and the outer plate is not required, even if there is some manufacturing error in any part of the chain, the felt will contract and close off the lubricant oil leakage route. In addition, the felt, even if compressed, has a small restoration force, so the chain's bending resistance does not become large, and the transmission loss of the chain is minimum.

The felt itself is porous and has a lubricant oil absorption function, so, even if positioned on the inner plate or the outer plate in a non-contact state, the lubricant oil is absorbed by the felt when touching it. Also, when the felt is impregnated with the lubricant oil in advance, compared to when the lubricant oil is merely coated or supplied between the pin and the bush, a large amount of lubricant oil is supplied to the chain, and the frictional life span of the chain can be significantly enhanced. Moreover, when the bush is made of sintered metal, lubricant oil can be supplied between the pin and the bush through the bush from the moisture absorption member.

What is claimed is:

1. A chain, comprising:

a plurality of link assemblies connected with each other, wherein one of said adjacent link assemblies has a first pair of plates disposed apart in a direction perpendicular to a longitudinal direction of said chain and a pair of hollow cylindrical bushes press-fitted to the first pair of plates, and wherein the other of said adjacent link assemblies has a second pair of plates disposed apart in a direction perpendicular to the longitudinal direction of said chain so as to locate at an outside of said first pair of plates and a pin penetrated through said bush and press-fitted to said second pair of plates, and wherein a moisture absorption member selected from the group consisting of porous felt, porous non-woven fabric and a porous sponge which retains lubricant oil between said bush and said pin is placed between facing surfaces of said first and second plates.

2. The chain as recited in claim 1, wherein said moisture absorption member is impregnated by lubricant oil in advance.

3. The chain as recited in claim 1, wherein said moisture absorption member is adhered to one of said surfaces facing one another.

4. The chain as recited in claim 1, wherein said bush is made of sintered metal and said lubricant oil is impregnated in said bush.

5. A chain, comprising:

a plurality of link assemblies connected with each other, wherein one of said adjacent link assemblies has a first pair of plates disposed apart in a direction perpendicular to a longitudinal direction of said chain and a pair of hollow cylindrical bushes press-fitted to the first pair of plates, and wherein the other of said adjacent link assemblies has a second pair of plates disposed apart in a direction perpendicular to the longitudinal direction of said chain so as to locate at an outside of said first pair of plates and a pin penetrated through said bush and press-fitted to said second pair of plates, and wherein a roller is provided around said bush, and wherein a moisture absorption member selected from the group consisting of porous felt, porous non-woven fabric and a porous sponge which retains lubricant oil between said bush and said roller is provided on the inside of said first pair of plates so as to contact said roller.

6. The chain as recited in claim 5, wherein said moisture absorption member is impregnated in advance.

7. The chain as recited in claim 5, wherein said moisture absorption member is adhered to said first pair of plates.

8. The chain as recited in claim 5, wherein said roller has a pair of circular stepped portions on the inner surface of both edges, and a moisture absorption member is placed in said circular stepped portion.

9. The chain as recited in claim 8, wherein said moisture absorption member protrudes from the edges of said roller, and said moisture absorption member touches the inside of said first pair of plates.

10. The chain as recited in claim 5, wherein said bush is composed of sintered metal, and said lubricant oil is impregnated in said bush.

* * * * *